United States Patent [19]

Carlton

[11] Patent Number: 4,474,115

[45] Date of Patent: Oct. 2, 1984

[54] TILTING TABLE

[75] Inventor: Charles D. Carlton, Conway, Ark.

[73] Assignee: Tiffany Industries, Inc., St. Louis, Mo.

[21] Appl. No.: 332,748

[22] Filed: Dec. 21, 1981

[51] Int. Cl.³ .............................................. A47F 5/12
[52] U.S. Cl. .......................................... 108/7; 108/9; 5/66
[58] Field of Search .................. 108/7; 297/284; 248/397; 5/66–69

[56] References Cited

U.S. PATENT DOCUMENTS

| 67,830 | 8/1867 | Wilke | 248/367 |
|---|---|---|---|
| 766,402 | 8/1904 | Van Camp | 108/9 X |
| 1,171,523 | 2/1916 | Kuhn | 108/7 |
| 2,639,541 | 5/1953 | Le Tang | 108/7 |
| 3,550,953 | 12/1970 | Neale | 297/284 X |
| 3,593,350 | 7/1971 | Knight | 5/66 |
| 4,271,830 | 6/1981 | Moon | 108/7 X |
| 4,361,917 | 12/1982 | Wilson | 5/69 X |

FOREIGN PATENT DOCUMENTS 863378  1/1941  France .................................... 5/66

*Primary Examiner*—William E. Lyddane
*Assistant Examiner*—Peter A. Aschenbrenner
*Attorney, Agent, or Firm*—Cohn, Powell & Hind

[57] ABSTRACT

A tilting table includes a table top, a base, linkage operatively interconnecting the base to the table top and an adjustment connected to the linkage for adjusting the angle of the table top relative to the base. The linkage includes a pivot connection interconnecting the table top and the base, a first link pivotally connected to the table top at one end and at the other end pivotally connected to the base and a second link connected to the first link and selectively actuated by the adjustment for actuating the first link and tilting the table top. The second link is connected to a traveling nut which is actuated by a threaded shaft for moving the second link and tilting the table top. The traveling nut and second link are carried by rollers supported by the base for supporting the table top.

8 Claims, 6 Drawing Figures

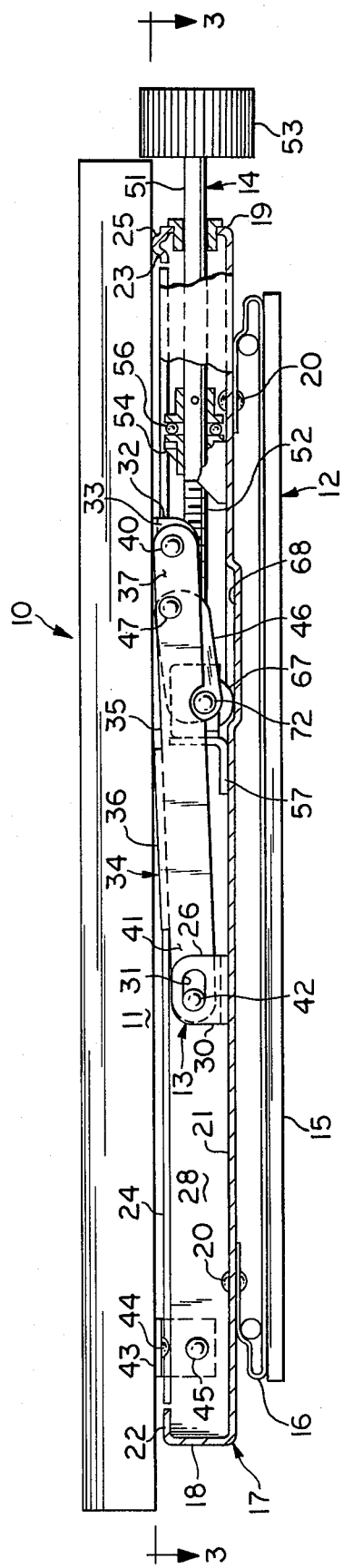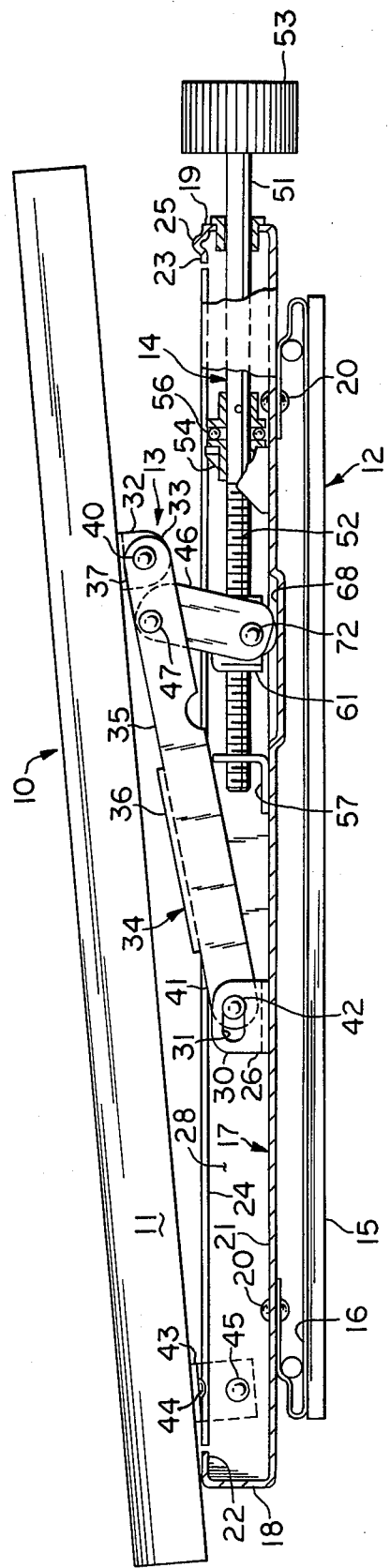

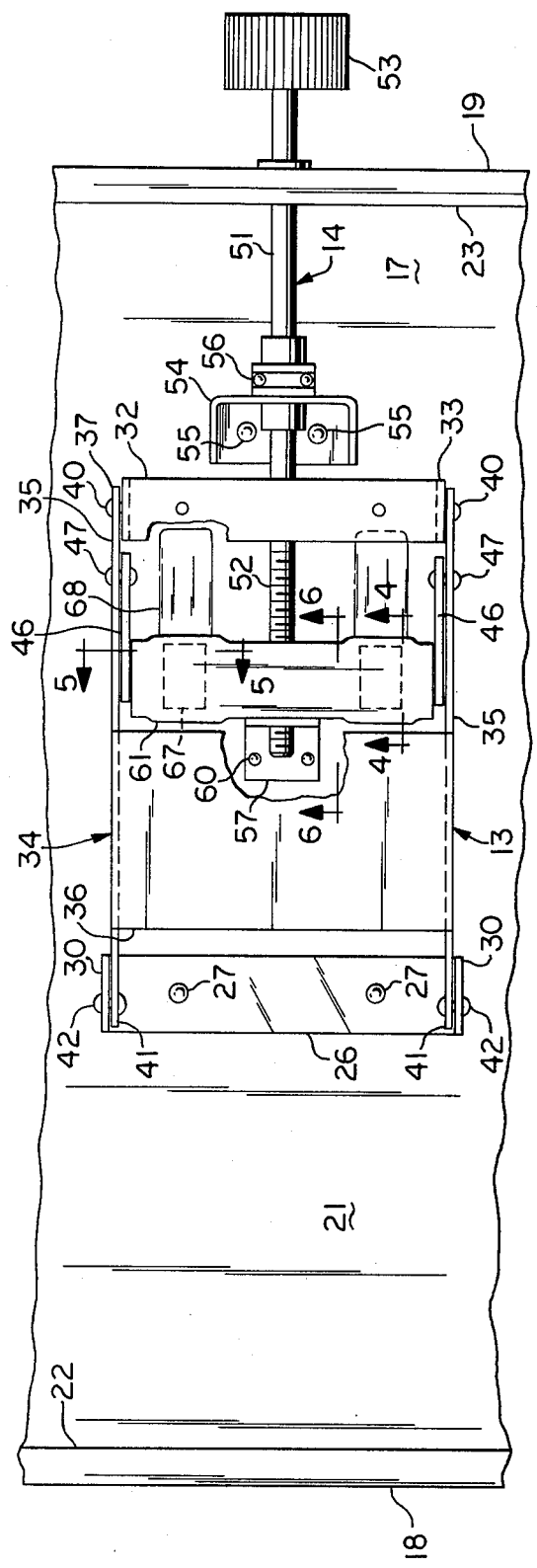

TILTING TABLE

BACKGROUND OF THE INVENTION

This invention relates generally to a table, and particularly to a table having a top which is capable of being tilted to a predetermined angle, and of being rotated.

Traditionally tables and desks have tops which are fixed and cannot be tilted without tilting the entire table or desk. When using computer terminals, particularly CRT (cathode ray tube) terminals which have a television-like screen, light glare on the face of the screen often times makes it difficult to read the information from the screen.

It is therefore desirable to be able to readily both rotate and tilt the CRT terminal to a position at which glare is minimized. Many applications of CRT terminals include office settings where fixed overhead lighting is utilized. In such a circumstance, it is often possible to minimize glare from overhead lighting on the face of the terminal by tilting the terminal at angles not greater than five degrees. Such tilting is not readily achievable using a traditional table or desk. Known turn-tables utilized for supporting CRT terminals do not provide for the tilting of the table top.

SUMMARY OF THE INVENTION

This tilting table provides a table top which is readily rotatable and tiltable for adjusting the angle of equipment placed on the table top such as CRT terminals, for minimizing glare.

The tilting table includes a table top supported by base support means. Linkage means operatively interconnect the base support means and the table top means. Adjustment means are connected to the linkage means and selectively actuate the linkage means for adjusting the angle of the table top relative to the base support means.

In one aspect of the invention, the linkage means includes pivot means pivotally interconnecting the table top means and base support means. The pivot means defines an axis about which the table top is tilted. A first link has one end pivotally connected to the table top and the other end pivotally connected to the base support means. One of these pivot connections of the first link is also slidable for allowing the table top to pivot about the axis. A second link means is operatively connected to the first link means and is selectively actuated by the adjustment means for actuating the first link means and tilting the table top.

In another aspect of the invention, the second link means includes a first end pivotally connected to the first link means, and a second end pivotally carried by the base support means. The second end pivot point of the second link means is selectively movable relative to the base support means for actuating the first link means.

In yet another aspect of the invention, the first link means includes a link bracket having opposed side link portions and an interconnecting web. The second link means includes a pair of opposed side second links. The second links are pivotally attached to the link bracket opposed side portions.

In another aspect of the invention, the first link is pivotally and slidably connected to the base support means.

In one aspect of the invention, the adjustment means includes a traveling nut means operatively connected to the linkage means. In another aspect of the invention, the traveling nut means includes a threaded shaft, and a nut threadedly mounted on the shaft and operatively connected to the linkage means. The threaded shaft is rotated for actuating the linkage means. The traveling nut means includes a bracket having roller means. The roller means support the bracket on the base support means. The linkage means are connected to the bracket. The bracket includes a threaded portion, constituting the nut, connected to the shaft for moving the bracket when the shaft is rotated. The base support means includes an indented track portion. The roller means engage the base support means on the track position. In another aspect of the invention, bearing means are carried by the base support means for supporing the threaded shaft. The bearing means support the threaded shaft substantially parallel to the base support means.

BRIEF DESCRIPTION OF THE DRAWINGS

FIG. 1 is a side elevational view, partially in crosssection, of the tilting table showing the table top in a horizontal position;

FIG. 2 is a side elevational view, partially in crosssection, of the tilting table showing the table top in a tilted position;

FIG. 3 is a top plan view of the linkage mechanism of the tilting table as taken on line 3—3 of FIG. 1;

FIG. 4 is an enlarged cross-sectional view taken on line 4—4 of FIG. 3;

FIG. 5 is an enlarged cross-sectional view taken on line 5—5 of FIG. 3, and

FIG. 6 is an enlarged cross-sectional view taken on line 6—6 of FIG. 3.

DESCRIPTION OF THE PREFERRED EMBODIMENT

Referring now by characters of reference to the drawings, and first to FIGS. 1 and 2, it will be understood that the tilting table generally indicated by 10 includes a table top means comprising the table top 11 and base support means generally indicated by 12. Linkage means 13 interconnect the table top 11 and base support means 12. Adjustment means 14 are carried by the base support means 12 and connected to the linkage means 13 for adjusting the angle of the table top 11 relative to the base support means 12.

The base support means 12 includes a base 15 carrying a rotative bearing 16. A base plate 17 is connected to the rotative bearing as by rivets 20. The base plate 17 includes a lower horizontal plate 21, an upstanding front wall 18 with an inturned lip 22, an upstanding rear wall 19 with an inturned lip 23, and a pair of opposed sidewalls 28 with inturned lips 24. The inturned lip 23 of the rear wall 19 includes an upward projection 25 which provides support for the table top 11 when the table top 11 is in its horizontal position shown in FIG. 1.

A U-shaped bracket 26 is attached to the lower plate 21 as by rivets 27, which is most clearly seen in FIG. 3. The U-shaped bracket 26 has upstanding opposed side portions 30, each side portion 30 including horizontal slots 31.

A second U-shaped bracket 32 is attached to the underside of the table top 11 as by screws (not shown). The second U-shaped bracket 32 includes downturned opposed side portions 33. An H-link 34, providing first link means, includes opposed side portions 35 and an interconnecting web 36. First ends 37 of the side link portions 35 are pivotally connected to the side portions 33 of the second U-bracket 32 as by rivets 40. Second ends 41 of the link side portions 35 are pivotally and slidable connected at the side slots 31 of the lower U-shaped bracket 26, as by rivets 42.

A pair of opposed side L-brackets 43 are connected to the underside of the table top 11 as by screws 44. The L-brackets 43 are rotatively connected to the sidewalls 28 of the lower plate 21 as by rivets 45, thereby providing an axis of rotation about which the table top 11 is pivotally connected.

A pair of opposed side links 46, constituting second link means, are pivotally connected to the side link portions 35 of the H-link 34 as by rivets 47. The connection of the links 46 to the side link portions 35 are adjacent to the first end 37 of the side link portions 35.

Traveling nut means indicated generally by 50 comprise the adjustment means for adjustably tilting the table top 11. The traveling nut means 50 includes a shaft 51 journaled in the rear wall 19 of the lower plate 21. The shaft 51 including a threaded portion 52 inwardly of the rear wall 19, and an actuating knob 53 attached to the shaft 51 outwardly of the rear wall 19. A support bracket 54 connected to the base plate 17 as by rivets 55 supports a rotative bearing 56 providing bearing means which rotatively supports the shaft 51 substantially parallel to the base support means. A stop-support bracket 57 receives the threaded end of the shaft 51, and is attached to the base plate 17 as by rivets 60.

The threaded portion 52 of the shaft 51 is received through a roller bracket 61 having front and rear walls 62 and 63. The shaft 51 passes through both the front and rear walls 62-63. Within the roller bracket 61, adjacent to the front and rear walls 62-63, are located threaded nuts 64 and 65 respectively as best seen in FIG. 6. These threaded nuts 64 and 65, constituting a threaded portion of the bracket 61, cause the roller bracket 61 to move longitudinally of the shaft 51 when the shaft 51 is rotated.

The roller bracket 61 includes a pair of opposed side roller supports 66, each roller support 66 including a roller 67 on an axle 70 as best seen in FIGS. 4 and 5. The rollers 67 engage the base plate 17 at indented track portions 68 of the base plate 17 for supporting the linkage means 13 and table top 11.

The roller bracket 61 including sidewalls 71. The opposed side links 46 are rotatably connected to the opposite sidewalls 71 of the roller bracket 61 as by rivets 72, for movement of the ends of the links 46 with the roller bracket 61 when the shaft 51 is rotated.

It is thought that the structural features and the functional advantages of the tilting table have become fully apparent from the foregoing description of parts, but for completeness of disclosure a complete description of the operation of the tilting table will be given.

When it is desired to adjust the angle of inclination of the table top 11 as from the horizontal position shown in FIG. 1, the shaft 51 is rotated by knob 53 in one direction causing the nuts 64-65 and roller bracket 61 to move rearwardly of their previous position. As the roller bracket 61 moves rearwardly, the lower ends of the links 46 are moved rearwardly thereby causing the first ends 37 of the H-link 34 to be raised to tilt the table top 11. The rivets 42 slide in the slots 31 of the lower U-shaped bracket 26 and provide, essentially a loss motion that is necessary as the table top 11 is pivoted about the axis defined by the rivets 42. The table top 11 is supported by the L-brackets 43, and supported rearwardly of the L-brackets 43 by the upper U-bracket 32 by its connection to the H-bracket 34 and the links 46 through the lower bracket 61, and ultimately by the rollers 67 engaging the base plate 17.

When it is desired to lower the angle of inclination of the table top 11, the shaft 51 is rotated in the opposite direction by knob 53, causing the roller bracket 61 to move forward with the ends of the links 46, and thereby lower the first ends 37 of the H-link 34. When the table top 11 is desired to be rotated in a horizontal plane, the table top 11 is grasped and turned about its "lazy susan type" bearing 16.

I claim as my invention:

1. A tilting table comprising:
  (a) a table top,
  (b) base support means for supporting the table top,
  (c) linkage means operatively interconnecting the base support means and table top,
  (d) adjustment means connected to the linkage means and selectively actuating the linkage means for adjusting the angle of the table top relative to the base support means, and
  (e) the linkage means including:
    1. pivot means pivotally interconnecting the table top means and base support means,
    2. a first link means having first and second ends, one end being pivotally connected to the table top means and the other end being pivotally connected to the base support means, and
    3. a second link means operatively connected to the first link means, and selectively actuated by the adjustment means for actuating the first link means for tilting the table top,
  (f) the second link means including:
    1. a first end pivotally connected to the first link means, and
    2. a second end pivotally carried by the base support means, the second end pivot point being selectively movable relative to the base support means for actuating the first link means,
  (g) the first link means includes a H-shaped link bracket having opposed side link portions and an interconnecting web the side link portions providing said first and second ends of the first link means, and
  (h) the second link means includes a pair of opposed side second links, one of the second links being attached to each of the opposed side link portions of the link bracket.

2. A tilting table as defined in claim 1, in which:
  (i) the second end of the first link means is rotatably and slidably supported by the base support means.

3. A tilting table comprising:
  (a) a table top,
  (b) base support means for supporting the table top,
  (c) linkage means operatively interconnecting the base support means and table top,
  (d) adjustment means connected to the linkage means and selectively actuating the linkage means for adjusting the angle of the table top relative to the base support means, and
  (e) the adjustment means including a traveling nut means connected to the linkage means,
  (f) the traveling nut means including a rotatably mounted threaded shaft, and a nut threadedly mounted on the shaft and operatively connected to the linkage means, the threaded shaft being rotated for actuating the linkage means, (g) the traveling nut means including a bracket having roller means, the roller means supporting the said bracket on the base support means, (h) the linkage means being connected to the said roller means bracket, and (i) the base support means including an indented track portion, the roller means engaging the base support means in the track portion.

4. A tilting table comprising:

(a) a table top, (b) base support means for supporting the table top, (c) linkage means operatively interconnecting the base support means and table top, (d) adjustment means connected to the linkage means and selectively actuating the linkage means for adjusting the angle of the table top relative to the base support means, (e) the linkage means including:
  1. pivot means interconnecting the table top means and base support means and defining an axis about which the table top means is selectively tilted,
  2. a first link pivotally connected at one end to the table top and pivotally connected at the other end to the base support means, at least one of the pivot connections of the first link includes a slidable connection of the first link for allowing tilting of the table top about its tilt axis, and
  3. a second link having first and second ends, the first end being pivotally connected to the first link, (f) the adjustment means includes:
  1. a bracket, the bracket including a threaded portion, the second end of the second link being pivotally connected to the bracket, and
  2. a threaded shaft threadably engaging the threaded portion of the bracket for selectively moving the bracket when the threaded shaft is rotated for moving the second end of the second link and for moving the first link to pivot the table top.

5. A tilting table as defined in claim 4, in which:

(g) the adjustment means includes rollers rotatively carried by the bracket and engaging the base support means for supporting the linkage means and table top.

6. A tilting table as defined in claim 5, in which:

(h) the base support means includes indented track portions which receive the rollers.

7. A tilting table as defined in claim 4, in which:

(g) bearing means carried by the base support means rotatively support the threaded shaft.

8. A tilting table as defined in claim 4, in which:

(g) the base support means includes a rotative bearing for rotatively supporting the threaded shaft.

* * * * *